United States Patent
Matsubara et al.

(10) Patent No.: US 6,910,344 B2
(45) Date of Patent: Jun. 28, 2005

(54) COMPRESSOR TORQUE ESTIMATE DEVICE, ENGINE CONTROLLER AND METHOD OF ESTIMATING COMPRESSOR TORQUE

(75) Inventors: Ryo Matsubara, Kariya (JP); Satoshi Umemura, Kariya (JP); Shingo Kumazawa, Kariya (JP); Hiroyuki Nakaima, Kariya (JP); Masahiro Kawaguchi, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 0 days.

(21) Appl. No.: 10/752,457

(22) Filed: Jan. 6, 2004

(65) Prior Publication Data

US 2004/0211204 A1 Oct. 28, 2004

(30) Foreign Application Priority Data

Jan. 8, 2003 (JP) ........................................ 2003-002415

(51) Int. Cl.⁷ .............................. F25B 1/00; F25B 49/00
(52) U.S. Cl. .................. 62/228.3; 62/228.1; 62/228.5; 62/244; 417/12; 417/34; 417/213
(58) Field of Search .............................. 62/228.1, 228.3, 62/228.5, 133, 244, 323.4; 417/12, 34, 213, 290

(56) References Cited

U.S. PATENT DOCUMENTS

| 4,992,715 | A | * | 2/1991 | Nakamura et al. ........... 318/649 |
| 5,666,917 | A | * | 9/1997 | Fraser et al. ........... 123/339.11 |
| 6,330,873 | B1 | * | 12/2001 | Letang et al. ................ 123/322 |
| 6,336,335 | B2 | | 1/2002 | Ota et al. ...................... 62/133 |
| 6,655,353 | B1 | * | 12/2003 | Rayl ........................... 123/436 |
| 6,684,863 | B2 | * | 2/2004 | Dixon et al. ................ 123/565 |
| 6,708,669 | B2 | * | 3/2004 | Kadoi .................... 123/339.17 |

FOREIGN PATENT DOCUMENTS

| JP | 11-291751 | 10/1999 |
| JP | 2001-180261 | 7/2001 |

* cited by examiner

*Primary Examiner*—Marc Norman
(74) *Attorney, Agent, or Firm*—Woodcock Washburn LLP

(57) ABSTRACT

A compressor torque estimate device is used for a variable displacement compressor whose displacement is variable based on a compressor control signal for estimating a compressor torque of the compressor. The compressor torque estimate device includes a torque calculator and a corrector. The torque calculator calculates a torque required for driving the compressor based on the compressor control signal, thereby obtaining a calculated torque. The corrector corrects the calculated torque by a procedure of first-order lag, thereby obtaining a corrected torque. The corrector also estimates the corrected torque to be the compressor torque.

10 Claims, 3 Drawing Sheets

COMPRESSOR TORQUE ESTIMATE DEVICE, ENGINE CONTROLLER AND METHOD OF ESTIMATING COMPRESSOR TORQUE

BACKGROUND OF THE INVENTION

The present invention relates to a compressor torque estimate device for estimating a torque required for driving a variable displacement compressor and an engine control device.

For example, as a refrigerant compressor in an air conditioner for a vehicle, there is a variable displacement compressor whose displacement can be changed based on a compressor control signal from an external device. When the displacement of the variable displacement compressor is changed, a torque (a compressor torque) required for driving the compressor is also varied.

Therefore, conventionally, in order to appropriately operate an engine of a vehicle as a drive source of the variable displacement compressor, the compressor torque is estimated, and an output torque of the engine is controlled by considering the compressor torque (e.g. page 8 and FIG. 6 in Japanese Patent Unexamined Publication No. 2001-180261). Although there is a method in which the compressor torque is directly detected with a torque sensor, the torque sensor is relatively expensive and increases cost. Accordingly, in a technique disclosed in Japanese Patent Unexamined Publication No. 2001-180261, the compressor torque of the variable displacement compressor is estimated based on the compressor control signal.

In the above method for estimating the compressor torque based on the compressor control signal, when the variable displacement compressor is during a steady state, the compressor torque can be estimated with a relatively high accuracy, that is, a difference between an estimated compressor torque and an actual torque (an actual compressor torque) is relatively small. However, in a time of transition when the displacement of the variable displacement compressor is rapidly excessively changed, for example, when an air conditioner switch is turned on or off, when the rotational speed of the engine is suddenly changed, when a set temperature is changed, or when an amount of air blowing out from the air conditioner is changed, the difference between the estimated compressor torque and the actual torque becomes large due to delay (mechanical response delay) of mechanical movement in a displacement-varying operation.

For example, when the air conditioner switch is turned on from an OFF-state, a compressor control signal for changing to a maximum displacement is supplied from an external device to the variable displacement compressor, which is in a minimum displacement state. Therefore, the compressor torque is estimated based on the compressor control signal as an instruction for changing to the maximum displacement when the air conditioner switch is turned on.

However, the displacement of the variable displacement compressor becomes the maximum late from the instruction for changing to the maximum displacement due to the mechanical response delay as mentioned above. Therefore, as shown in a graph in FIG. 4, an extremely high torque value as the compressor torque (a solid line) is estimated almost as soon as the air conditioner switch is turned on. On the other hand, an actual torque (a dotted line) gradually increases from a low torque value. Therefore, during a certain period from a time when the air conditioner is turned on, the difference between the estimated compressor torque and the actual torque becomes large. During the certain period when the difference is large, an output torque of the engine cannot be appropriately controlled. The engine excessively rotates, and gasoline mileage and drivability of the vehicle deteriorate.

SUMMARY OF THE INVENTION

The present invention provides a compressor torque estimate device capable of estimating a compressor torque that is different from an actual torque in a relatively small degree even when a compressor control signal is rapidly excessively changed, and an engine control device.

In accordance with the present invention, a compressor torque estimate device is used for a variable displacement compressor whose displacement is variable based on a compressor control signal for estimating a compressor torque of the compressor. The compressor torque estimate device includes a torque calculator and a corrector. The torque calculator calculates a torque required for driving the compressor based on the compressor control signal, thereby obtaining a calculated torque. The corrector corrects the calculated torque by a procedure of first-order lag, thereby obtaining a corrected torque. The corrector also estimates the corrected torque to be the compressor torque.

The present invention is also applicable to an engine control device for controlling an output torque of an engine that drives a vehicle and a variable displacement compressor in an air conditioner for the vehicle. A displacement of the variable displacement compressor is variable based on a compressor control signal. The engine control device includes a compressor torque estimate device for estimating a compressor torque of the compressor, and an engine controller. The compressor torque estimate device includes a torque calculator and a corrector. The torque calculator calculates a required torque for driving the compressor based on the compressor control signal, thereby obtaining a calculated torque. The corrector corrects the calculated torque by a procedure of first-order lag, thereby obtaining a corrected torque. The corrector also estimates the corrected torque to be the compressor torque. The engine controller controls the output torque of the engine by considering the compressor torque of the compressor estimated by the corrector.

The present invention also provides a method of estimating a compressor torque of a displacement variable compressor whose displacement is variable based on a compressor control signal. The method includes the steps of calculating a torque required for driving the compressor based on the compressor control signal to obtain a calculated torque, correcting the calculated torque by a procedure of first-order lag to obtain a corrected torque, and estimating the corrected torque to be the compressor torque.

BRIEF DESCRIPTION OF THE DRAWINGS

The features of the present invention that are believed to be novel are set forth with particularity in the appended claims. Aspect of the invention may best be understood by reference to the following description of the presently preferred embodiments together with the accompanying drawings in which:

DETAILED DESCRIPTION OF THE PREFERRED EMBODIMENTS

A preferred embodiment according to the present invention will be described. The present invention is applied to an air conditioner for a vehicle.

Figure 1:
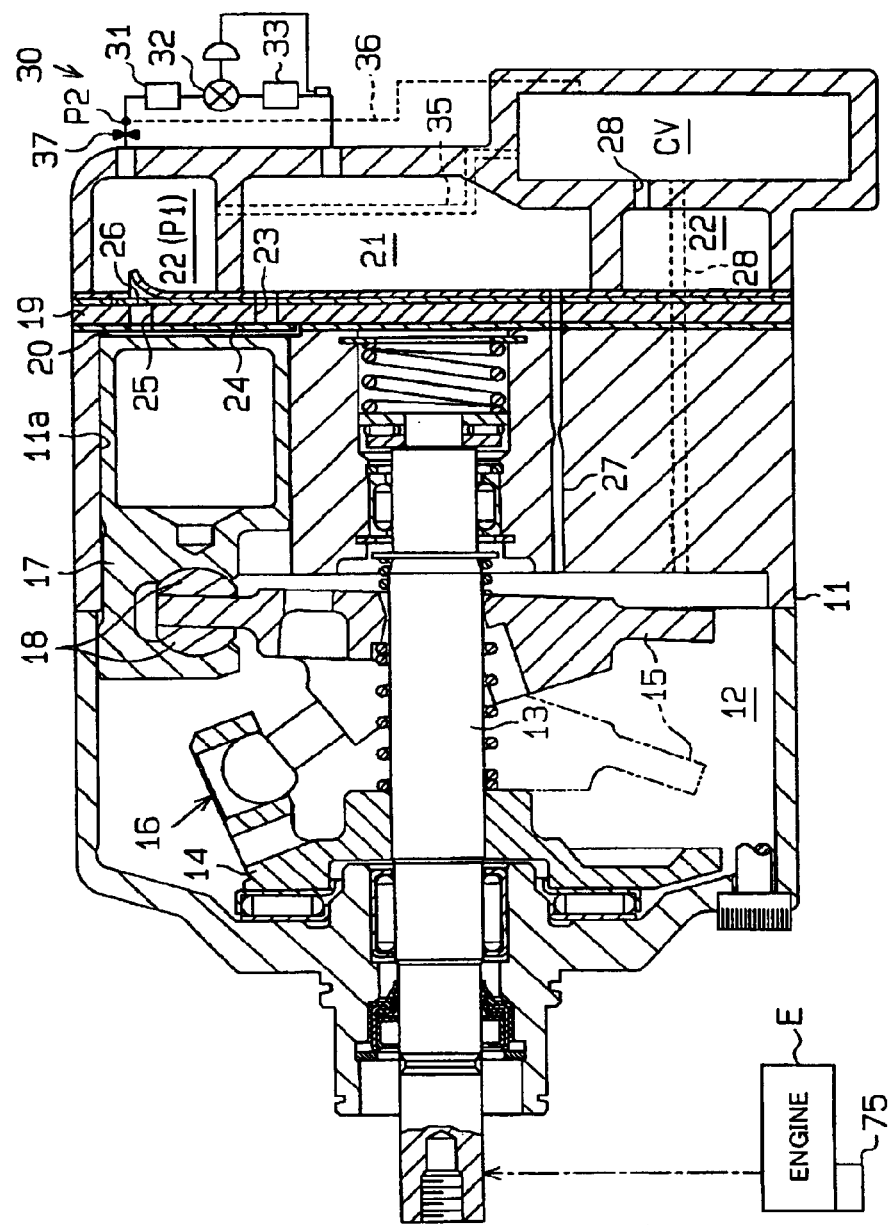
FIG. 1 is a longitudinal cross-sectional view of a compressor according to a preferred embodiment.

As shown in FIG. 1, a variable displacement compressor includes a housing 11. A crank chamber 12 as a control chamber is defined in the housing 11. A drive shaft 13 is rotatably arranged in the crank chamber 12. The drive shaft 13 is operatively connected to an engine E (internal combustion engine) as a drive source for a vehicle. The drive shaft 13 is rotatably driven by supplying power from the engine E.

A lug plate 14 is integrally rotatably mounted on the drive shaft 13 in the crank chamber 12. A swash plate 15 as a cam plate is accommodated in the crank chamber 12. The swash plate 15 is slidably inclinably supported by the drive shaft 13. A hinge mechanism 16 is interposed between the lug plate 14 and the swash plate 15. Therefore, the swash plate 15 is rotatable synchronously with the lug plate 14 and the drive shaft 13 and inclinable with respect to the axis of the drive shaft 13 through the hinge mechanism 16.

A plurality of cylinder bores 11a is formed in the housing 11. Only one cylinder bore 11a is shown in FIG. 1. A single-headed piston 17 is accommodated in each of the cylinder bores 11a so as to reciprocate therein. Each of the pistons 17 is coupled to the swash plate 15 through a pair of shoes 18. Therefore, the rotational movement of the swash plate 15 in accordance with the rotation of the drive shaft 13 is converted into the reciprocating movement of the piston 7 through the pair of shoes 18.

A valve plate assembly 19 is arranged in the housing 11. A compression chamber 20 is defined by the piston 17 and the valve assembly 19 on the back side (the right side in FIG. 1) in the cylinder bore 11a. A suction chamber 21 and a discharge chamber 22 are defined in the housing 11 on the back side of the valve plate assembly 19.

As the piston 17 moves from its top dead center to its top bottom dead center, refrigerant gas in the suction chamber 21 is introduced into the compression chamber 20 through a suction port 23 and a suction valve 24 that are formed in the valve plate assembly 19. As the piston 17 moves from its bottom dead center to its top dead center, the refrigerant gas introduced into the compression chamber 20 is compressed to a predetermined pressure and is discharged into the discharge chamber 22 through a discharge port 25 and a discharge valve 26 that are formed in the valve plate assembly 19.

A bleed passage 27 and a supply passage 28 are provided in the housing 11. The bleed passage 27 interconnects the crank chamber 12 with the suction chamber 21. The supply passage 28 interconnects the discharge chamber 22 with the crank chamber 12. A control valve CV is arranged on the supply passage 28 in the housing 11.

A balance between a quantity of high-pressure discharged gas introduced from the discharge chamber 22 through the supply passage 28 into the crank chamber 12 and a quantity of the gas discharged from the crank chamber 12 through the bleed passage 27 into the suction chamber 21 is controlled by adjusting the opening degree of the control valve CV. And then, the pressure in the crank chamber 12 is determined. A pressure differential between the crank chamber 12 and the compression chamber 20 is varied in accordance with a change in the pressure in the crank chamber 12, and an inclination angle of the swash plate 15 is varied. As a result, the stroke of the piston 17, that is, the displacement of the compressor is adjusted. The inclination angle of the swash plate 15 is an angle between the swash plate 15 and a hypothetical plane perpendicular to the axis of the drive shaft 13.

For example, when the pressure in the crank chamber 12 is decreased, the inclination angle of the swash plate 15 is increased, and the displacement of the compressor is increased. On the other hand, when the pressure in the crank chamber 12 is increased, the inclination angle of the swash plate 15 is decreased, and the displacement of the compressor is decreased. As shown by a solid line in FIG. 1, a minimum inclination angle of the swash plate 15, that is, a minimum displacement of the compressor is substantially set at zero. Accordingly, when the compressor is in a minimum displacement state, a load for driving the compressor that is applied to the engine E is considered substantially zero.

As shown in FIG. 1, a refrigerant circulation circuit in an air conditioner for the vehicle includes the above-mentioned compressor and an external refrigerant circuit 30. The external refrigerant circuit 30 includes a condenser 31, an expansion valve 32 as a pressure reducing device and an evaporator 33.

A first pressure monitoring point P1 is set in the discharge chamber 22. A second pressure monitoring point P2 is set in a refrigerant passage at a predetermined distance from the first pressure monitoring point P1 toward the condenser 31. The first pressure monitoring point P1 is interconnected with the control valve CV through a first pressure introducing passage 35. The second monitoring point P2 is interconnected with the control valve CV through a second pressure introducing passage 36. A fixed throttle 37 is formed in the refrigerant passage between the first and second pressure monitoring points P1 and P2.

Figure 2:
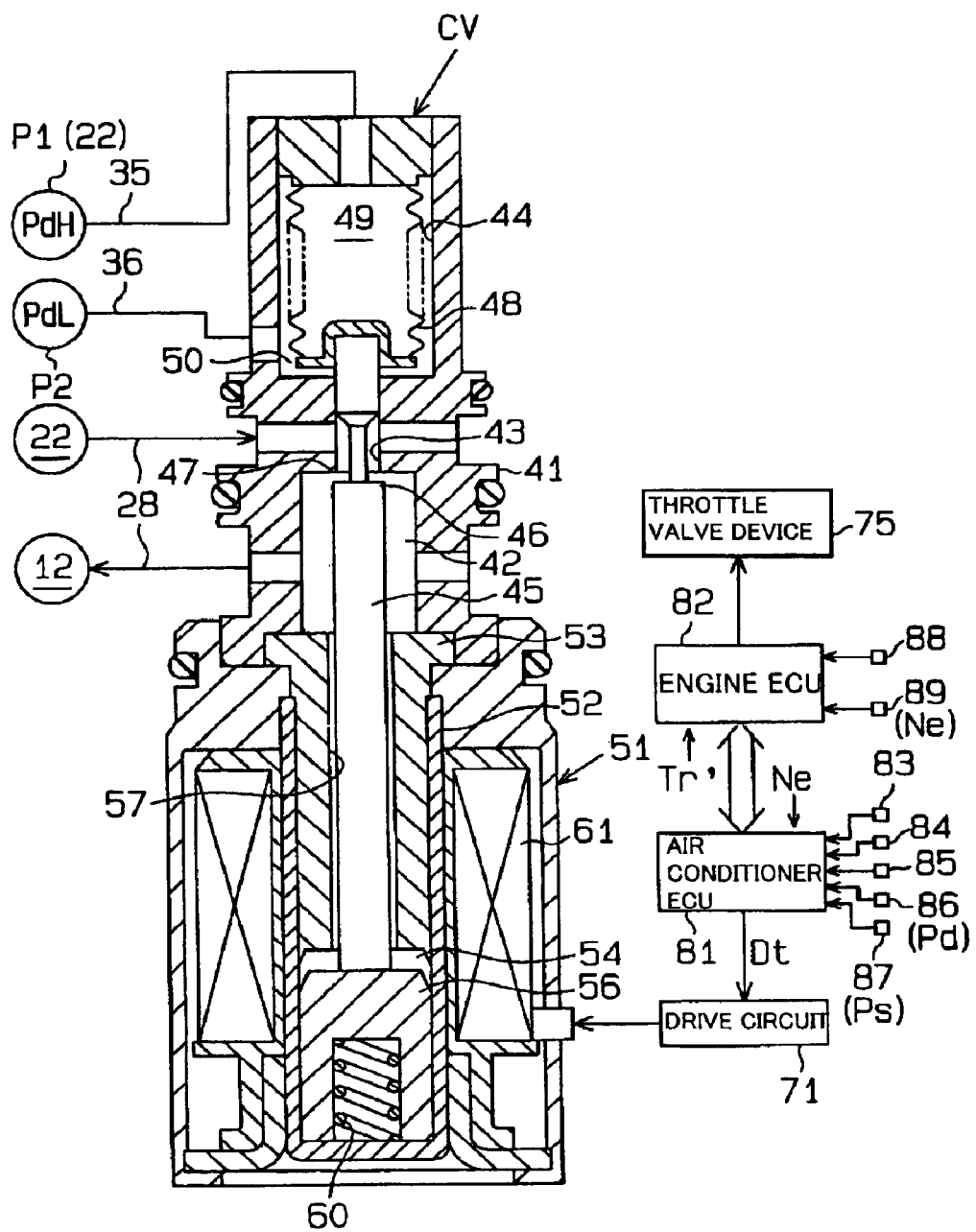
FIG. 2 is a cross-sectional view of a control valve according to the preferred embodiment.

As shown in FIG. 2, a valve chamber 42, a communication passage 43 and a pressure sensing chamber 44 are formed in a valve housing 41 of the control valve CV. A rod 45 is movably arranged in the valve chamber 42 and the communication passage 43 in an axial direction (in a vertical direction in FIG. 2). The upper end portion of the rod 45 is interposed into the communication passage 43 and blocks the pressure sensing chamber 44 from the communication passage 43. The valve chamber 42 is interconnected with the crank chamber 12 through the downstream part of the supply passage 28. The communication passage 43 is interconnected with the discharge chamber 22 through the upstream part of the supply passage 28. The valve chamber 42 and the communication passage 43 institutes a part of the supply passage 28.

The rod 45 includes a valve body 46 in the intermediate part of the rod 45. The valve body 46 is arranged in the valve chamber 42. A step located between the valve chamber 42 and the communication passage 43 forms a valve seat 47. The communication passage 43 forms a valve hole. When the rod 45 moves upward from the position (a lowest position) in FIG. 2 to a top position (a highest position) where the valve body 46 of the rod 45 contacts the valve seat 47, the communication passage 43 is blocked. Namely, the valve body 46 of the rod 45 functions as a valve body capable of adjusting the opening degree of the supply passage 28.

A pressure sensing member 48 constituted of a bellows is accommodated in the pressure sensing chamber 44. The upper end portion of the pressure sensing member 48 is fixed to the valve housing 41. The upper end portion of the rod 45 is interposed into the lower end portion (a movable end) of the pressure sensing member 48. A first pressure chamber 49 that is the inside of the pressure sensing member 48 and a second pressure chamber 50 that is the outside of the pressure sensing member 48 are defined in the pressure sensing chamber 44 by the pressure sensing member 48 forming a cylinder with a bottom in shape. A pressure Pd H at the first pressure monitoring point P1 is introduced into the first pressure chamber 49 through the first pressure introducing passage 35. A pressure Pd L at the second pressure monitoring point P2 is introduced into the second pressure chamber 50 through the second pressure introducing passage 36. Namely, the pressure sensing chamber 44 and the pressure sensing member 48 constitute a pressure differential detector and detect a pressure differential between the first and second pressure monitoring points P1 and P2.

An electromagnetic actuator 51 as a set pressure differential changing means is provided on the lower side of the valve housing 41. The electromagnetic actuator 51 includes an accommodation cylinder 52 forming a cylinder with a bottom in shape in an intermediate part in the valve housing 41. A center post (a fixed iron core) 53 forming a column in shape is fixedly interposed into the accommodation cylinder 52 at the opening of the upper side of the accommodation cylinder 52. Therefore, a plunger chamber 54 is defined on a lower side in the accommodation cylinder 52.

A plunger (a movable iron core) 56 forming a cylinder with a cover in shape is movably accommodated in the plunger chamber 54 in the axial direction. A guide hole 57 is formed in the center of the center post 53 so as to extend therethrough in the axial direction. The lower end portion of the rod 45 is movably arranged in the guide hole 57 in the axial direction. The lower end surface of the rod 45 contacts the upper end surface of the plunger 56 in the plunger chamber 54.

A spring 60 for urging the plunger 56 is accommodated between the inner bottom surface of the accommodation cylinder 52 and the plunger 56 in the plunger chamber 54. The spring 60 urges the plunger 56 toward the side of the rod 45. The rod 45 is urged toward the side of the plunger 56 based on spring characteristics of the pressure sensing member 48 (hereinafter called a bellows spring 48). Therefore, the plunger 56 and the rod 45 continuously integrally move upward and downward. The bellows spring 48 whose spring force is larger than that of the spring 60 is utilized.

A coil 61 is formed around the accommodation cylinder 52 on the outer circumferential side of the accommodation cylinder 32 in a range crossing the center post 53 and the plunger 56. Electric power is supplied from a drive circuit 71 to the coil 61. A magnitude of electromagnetic force (electromagnetic attraction) in accordance with a supply amount of the electric power generates between the plunger 56 and the center post 53 by supplying the electric power from the drive circuit 71 to the coil 61. The electromagnetic force is transmitted through the plunger 56 to the rod 45. Energization control to the coil 61 is performed by adjusting applied voltage. Pulse width modulation control is utilized for adjusting the applied voltage.

In the control valve CV, the position of the rod 45 (the valve body 46), that is, the opening degree of the supply passage 28 is determined as follows.

As shown in FIG. 2, when the coil 61 is not energized (a duty ratio Dt is equal to zero %), the downward urging force of the bellows spring 48 is dominant for positioning the rod 45. Therefore, the rod 45 is positioned at the lowest position of the rod 45, and the valve body 46 fully opens the communication passage 43. The pressure in the crank chamber 12 becomes the possible maximum pressure under the conditions at the time. The pressure differential between the crank chamber 12 and the compression chamber 20 through the piston 17 is relatively large. As a result, the inclination angle of the swash plate 15 becomes the minimum, and the displacement of the compressor becomes the minimum.

In the control valve CV, when the coil 61 is energized at more than a minimum duty ratio (more than 0%) in a duty ratio variable range, the sum of the spring force of the spring 60 and the upward electromagnetic force is larger than the downward urging force by the bellows spring 48, and the rod 45 begins to move upward. In this state, the spring force of the spring 60 and the upward electromagnetic force acts against the downward urging force of the bellows spring 48 and a downward pressing force based on pressure differential $\Delta Pd$ (=Pd H–Pd L) between the first and second pressure monitoring points P1 and P2. The valve body 46 of the rod 45 is positioned with respect to the valve seat 47 at a position where these upward and downward urging forces reach balance.

For example, when the rotational speed of the engine E decreases and flow rate of the refrigerant gas in the refrigerant circulation circuit decreases, the downward pressing force based on the pressure differential $\Delta Pd$ between the first and second pressure monitoring points P1 and P2 decreases. The upward and downward urging forces applied to the rod 45 cannot maintain the balance by the electromagnetic force at the time. Therefore, the rod 45 (the valve body 46) moves upward, the opening degree of the communication passage 43 decreases, and the pressure in the crank chamber 12 tends to fall. Consequently, the swash plate 15 is inclined in a direction in which the inclination angle of the swash plate 15 increases, and the displacement of the compressor is increased. As the displacement of the compressor is increased, the flow rate of the refrigerant gas in the refrigerant circulation circuit increases, and the pressure differential $\Delta Pd$ between the first and second pressure monitoring points P1 and P2 increases.

On the other hand, when the rotational speed of the engine E increases and the flow rate of the refrigerant gas in the refrigerant circulation circuit increases, the downward pressing force based on the pressure differential $\Delta Pd$ between the first and second pressure monitoring points P1 and P2 increases. The upward and downward urging forces applied to the rod 45 cannot maintain the balance by the electromagnetic force at the time. Therefore, the rod 45 (the valve body 46) moves downward, the opening degree of the communication passage 43 increases, and the pressure in the crank chamber 12 tends to increase. Consequently, the swash plate 15 is inclined in a direction in which the inclination angle of the swash plate 15 decreases, and the displacement of the compressor is decreased. As the displacement of the compressor is decreased, the flow rate of the refrigerant gas in the refrigerant circulation circuit decreases, and the pressure differential $\Delta Pd$ between the first and second pressure monitoring points P1 and P2 decreases.

Also, for example, when the duty ratio Dt upon energizing the coil 61 becomes large and the upward electromagnetic force becomes large, the upward and downward urging forces cannot maintain the balance by the downward pressing force based on the pressure differential ΔPd between the first and second pressure monitoring points P1 and P2 at the time. Consequently, the rod 45 (the valve body 46) moves upward, the opening degree of the communication passage 43 decreases, and the displacement of the compressor is increased. As a result, the flow rate of the refrigerant gas in the refrigerant circulation circuit increases, and the pressure differential ΔPd between the first and second pressure monitoring points P1 and P2 increases.

On the other hand, when the duty ratio Dt upon energizing the coil 61 becomes small and the upward electromagnetic force becomes small, the upward and downward urging forces cannot maintain the balance by the downward pressing force based on the pressure differential ΔPd between the first and second pressure monitoring points P1 and P2 at the time. Consequently, the rod 45 (the valve body 46) moves downward, the opening degree of the communication passage 43 increases, and the displacement of the compressor is decreased. As a result, the flow rate of the refrigerant gas in the refrigerant circulation circuit decreases, and the pressure differential ΔPd between the first and second pressure monitoring points P1 and P2 decreases.

Namely, the control valve CV is formed so as to internally autonomously position the rod 45 (the valve body 46) in accordance with the change of the pressure differential ΔPd between the first and second pressure monitoring points P1 and P2. The rod 45 is positioned in such a manner that a control target (a set pressure differential) of the pressure differential ΔPd determined by the duty ratio Dt (a compressor control signal) upon energizing the coil 61 is maintained. Also, the set pressure differential can be changed from an external device by adjusting the duty ratio Dt upon energizing the coil 61. In other words, the electromagnetic actuator 51, the pressure sensing chamber 44 and the bellows spring 48 constitute a compressor controller, determine the set pressure differential based on the duty ratio Dt, and adjust the displacement of the compressor in such a manner that the pressure differential detected by the pressure differential detector approaches the set pressure differential.

As shown in FIG. 2, an air conditioner ECU 81 that generally conducts control of the air conditioner and an engine ECU 82 that generally conducts control of the engine E are installed in the vehicle. Each of the air conditioner ECU 81 and the engine ECU 82 is an electronic control unit that includes a CPU, a ROM, a RAM and an I/O interface and that is similar to a computer. The air conditioner ECU 81 is communicably connected to the engine ECU 82.

An air conditioner switch 83, a temperature setting device 84, a temperature sensor 85, a Pd sensor 86 and a Ps sensor 87 are connected to the air conditioner ECU 81. The air conditioner switch 83 is an on-off switch for the air conditioner operated by an occupant. The temperature setting device 84 is a device for an occupant to set a set temperature in a vehicle compartment. The temperature sensor 85 detects a temperature in the vehicle compartment. In the refrigerant circulation circuit, the Pd sensor 86 detects a pressure Pd in a discharge pressure region including the refrigerant passage between the discharge chamber 22 in the compressor and the condenser 31, the discharge chamber 22 and the condenser 31. In the refrigerant circulation circuit, the Ps sensor 87 detects a pressure Ps in a suction pressure region including a refrigerant passage between the evaporator 33 and the suction chamber 21 in the compressor, the evaporator 33 and the suction chamber 21. Also, the drive circuit 71, or the control valve CV (the coil 61) as a control element is connected to the air conditioner ECU 81.

An accelerator position sensor 88 for detecting an accelerator position (a degree of an accelerator pushed down) and a rotational speed sensor 89 for detecting a rotational speed Ne of the engine E are connected to the engine ECU 82. Also, an electronically controlled throttle valve device 75 provided in the engine E is connected as a control element to the engine ECU 82.

The air conditioner ECU 81 calculates the duty ratio Dt based on information (e.g. information on the on-off state of the air conditioner switch 83, the temperature in the vehicle compartment and the set temperature) from information detecting means for air conditioning, that is, from the air conditioner switch 83, the temperature setting device 84 and the temperature sensor 85. The air conditioner ECU 81 instructs the drive circuit 71 to energize the coil 61 at a calculated duty ratio Dt.

For example, when the air conditioner switch 83 is in an ON-state, the air conditioner ECU 81 compares the set temperature of the temperature setting device 84 with a detected temperature of the temperature sensor 85. The air conditioner ECU 81 changes the duty ratio Dt in such a manner that the detected temperature approaches the set temperature. Namely, when the detected temperature is higher than the set temperature, the duty ratio Dt is increased. Accordingly, the displacement of the compressor is increased. On the other hand, when the detected temperature is lower than the set temperature, the duty ratio Dt is decreased. Accordingly, the displacement of the compressor is decreased.

Also, the air conditioner ECU 81 forms a compressor torque estimate device. The air conditioner ECU 81 estimates a compressor torque Tr' required for driving the compressor based on the duty ratio Dt upon energizing that is sent as an instruction for the control valve CV from the air conditioner ECU 81 to the drive circuit 71. The air conditioner ECU 81 transmits information on the compressor torque Tr' to the engine ECU 82.

The air conditioner ECU 81 functions as a torque calculator and calculates a torque Tr(n) required for driving the compressor under the conditions (Pd, Ps, Ne and Dt) based on information (Pd, Ps, Ne and Dt) from information detecting means for calculating torque, that is, from the Pd sensor 86, the Ps sensor 87 and the rotational speed sensor 89. The air conditioner ECU 81 calculates the torque Tr(n) with a pre-stored equation (1) as follows:

$$Tr(n) = (\text{theoretical torque})/(\text{operating efficiency}) = 60/2\pi Nc \cdot [m/(m-1) \cdot Pd \cdot Qd \cdot \{1-(Pd/Ps)^{(1-m)/m}\}]/\eta ad \quad (1)$$

wherein m denotes a ratio of specific heat (1.03 when the refrigerant gas is R134a), Nc denotes a rotational speed (rpm) of the compressor (the drive shaft 13), Qd denotes a flow rate of the refrigerant gas, Pd denotes a discharge pressure, and Ps denotes a suction pressure. Also, "n" is a counted value whose initial value is "two". "One" is added to "n" every time a compressor torque estimate routine is repeated. When the air conditioner switch 83 is turned off, the counted value n is reset to the initial value. Torque Tr(1) is pre-stored as zero. A calculated torque Tr(n) is temporarily stored in a RAM of the air conditioner ECU 81 until a next compressor torque estimate routine finishes.

A rotational speed Nc of the drive shaft 13 is calculated by considering a pre-stored pulley ratio (change gear ratio) in a power transmission path between the engine E and the drive shaft 13 into information on the rotational speed Ne of the engine E received from the engine ECU 82. Namely, the rotational speed sensor 89 functions as a rotational speed detecting means for detecting a physical quantity or the rotational speed Ne of the engine E having correlation with the rotational speed Nc of the drive shaft 13.

The flow rate Qd of the refrigerant gas is expressed by "(a flow coefficient)·(an area of the fixed throttle 37)·$\sqrt{(2\Delta Pd/\rho d)}$". The pressure differential ΔPd is determined by a function of an input electric current value to the coil 61 of the control valve CV and valve characteristics of the control valve CV. The input electric current is determined from the duty ratio Dt and a voltage of a power supply (a battery). The specific gravity ρd of the discharged gas can approach the discharge pressure Pd. Namely, the air conditioner ECU 81, which determines the pressure differential ΔPd, functions as a refrigerant flow rate detecting means. The air conditioner ECU 81 is capable of obtaining the flow rate Qd of the refrigerant gas from the duty ratio Dt, which is sent as the instruction from the air conditioner ECU 81 to the drive circuit 71.

The operating efficiency ηad of the compressor is calculated by the following equation (2):

$$\eta ad = 1 - A \cdot Nc / \{(B \cdot Qd)^c + A \cdot Nc\} \quad (2)$$

wherein "A", "B" and "C" are constants that are predetermined by an experiment.

The air conditioner ECU 81 functions as a corrector. The air conditioner ECU 81 corrects the calculated Torque Tr(n) by a procedure of first-order lag and a procedure of delay and estimates a corrected torque to be a compressor torque Tr'.

Namely, the air conditioner ECU 81 functions as a corrector for the procedure of the first-order lag and calculates a candidate torque Tr'(n) with the following equation (3) from a torque Tr(n−1) calculated at the last routine and a candidate torque Tr'(n−1) of the compressor torque Tr' calculated at the last routine:

$$Tr'(n) = (1 - e^{-at}) \cdot Tr'(n-1) + e^{-at} \cdot Tr(n-1) \quad (3)$$

wherein "a" is a time constant, and "t" is a sampling time of the air conditioner ECU 81.

The air conditioner ECU 81 stores a calculated candidate torque Tr'(n) as a latest value in a candidate torque storage region of the RAM of the air conditioner ECU 81. The candidate torque storage region is capable of storing a plurality of candidate torques Tr'(n) in order of calculation. The plurality is a predetermined number (Tr'(n), Tr'(n−1), Tr'(n−2) . . . ). In the plurality of candidate torques stored in the candidate torque storage region, an oldest value is deleted every time a new candidate torque Tr'(n) is calculated. The value calculated at the next routine relative to a routine where the oldest value is calculated is considered a new oldest value.

The air conditioner ECU 81 functions as a corrector for the procedure of the delay. The air conditioner ECU 81 reads out the oldest value stored in the candidate torque storage region of the RAM, estimates the compressor Torque Tr' to be the oldest value, and sends the compressor torque Tr' to the engine ECU 82. A period that the routine is repeated until the latest value in the candidate torque storage region is changed into the oldest value, that is, a delay time as a predetermined time in a correction by the procedure of the delay can be predetermined by a number of the candidate torque Tr'(n) stored in the candidate torque storage region.

When the air conditioner switch 83 is turned off, all values of the candidate torques Tr'(n) including the latest value and the oldest value are reset to zero in the candidate torque storage region of the RAM. Also, a candidate torque Tr'(1) is pre-stored as zero. Therefore, the compressor torque Tr' is estimated to be zero during the predetermined delay time from a time when the air conditioner switch 83 is turned on.

The engine ECU 82 as an engine controller calculates a target engine output torque from information on the accelerator position from the accelerator position sensor 88 and the rotational speed Ne from the rotational speed sensor 89 and information on the compressor torque Tr' received from the air conditioner ECU 81. The engine ECU 82 actuates the throttle valve device 75 based on a calculated target engine output torque and adjusts an intake air quantity of engine E.

According to the preferred embodiment, the following advantageous effects are obtained.

(1) The air conditioner ECU 81 calculates the torque Tr(n) required for driving the compressor based on information such as the duty ratio Dt, which is sent as the instruction from the air conditioner ECU 81 to the drive circuit 71. And then, the air conditioner ECU 81 corrects the calculated torque Tr(n) by the procedure of the first-order lag and estimates the compressor torque Tr' from the corrected candidate torque Tr'(n). Therefore, even during a time of transition when the displacement of the compressor is rapidly excessively changed, the estimated compressor torque Tr' can be gradually changed in accordance with mechanical response delay of the compressor. Accordingly, even during the time of transition, the difference between the estimated compressor torque Tr' and an actual torque can be relatively small.

(2) The air conditioner ECU 81 corrects the torque Tr(n) by the procedure of the delay in addition to the procedure of the first-order lag. Therefore, the procedure of the delay can cover an area that cannot be covered by the procedure of the first-order lag, that is, an area in which it is hard to reduce the difference between the estimated compressor torque Tr' and the actual torque. Even in the above area, the difference between the estimated compressor torque Tr' and the actual torque can be relatively small.

Figure 3:
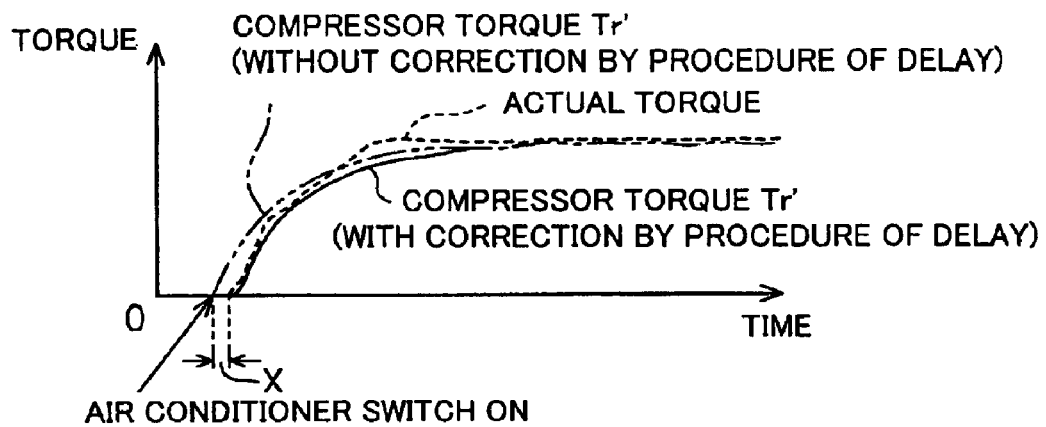
FIG. 3 is a graph showing changes in a compressor torque and an actual torque after an air conditioner switch is turned on in the preferred embodiment.

Namely, for example, when the air conditioner switch 83 is turned on from an OFF-state, the air conditioner ECU 81 rapidly changes the duty ratio Dt, which is sent as the instruction from the air conditioner ECU 81 to the drive circuit 71, from zero substantially to a maximum value based on a relatively large difference between the detected temperature and the set temperature. Therefore, the duty ratio Dt sent as the instruction to the drive circuit 71 is rapidly increased from zero substantially to the maximum value, and the opening degree of the control valve CV is rapidly decreased. However, as shown by the dotted line in FIG. 3, due to the mechanical response delay of the variable displacement compressor including the swash plate 15, there is a slight delay (a dead area X) until the displacement of the compressor begins to increase from the minimum displacement, that is, until the actual torque begins to increase from zero.

The procedure of the first-order lag can appropriately deal with only a response delay until the displacement of the compressor reaches a desired displacement corresponding to the duty ratio Dt from the start of change in the displacement of the compressor (change of the inclination angle of the swash plate 15). Therefore, as shown by a two-dot line in FIG. 3, when the compressor torque Tr(n) is corrected only by the procedure of the first-order lag, the difference between the estimated compressor torque Tr' and the actual torque is large to some extent.

However, in the present preferred embodiment, the procedure of the delay is utilized in combination with the procedure of the first-order lag. As shown by a solid line in FIG. 3, the estimated compressor torque Tr' begins to change after the delay time from the time when the duty ratio Dt is changed. Therefore, in the dead area X, the difference between the estimated compressor torque Tr' and the actual torque can be relatively small.

(3) The air conditioner ECU 81 continuously corrects the calculated Tr(n). It is assumed that the air conditioner ECU 81 is formed so as to correct the calculated Tr(n) only during the time of transition when the displacement of the compressor is rapidly excessively changed and not during the steady state. Compared to this case, a program can be simple in the present preferred embodiment, and a computing load on the air conditioner ECU 81 can be reduced.

(4) The engine ECU 82 adjusts the intake air quantity of the engine E by considering the compressor torque Tr', which is estimated by the air conditioner ECU 81. Therefore, for example, when the air conditioner switch 83 is turned on from the OFF-state, the intake air quantity of the engine E can be appropriately adjusted even during the time of transition when the displacement of the compressor is rapidly excessively changed. Accordingly, the engine E appropriately rotates, and gasoline mileage and drivability of the vehicle can be improved.

According to the present invention, following alternative embodiments may be practiced.

Figure 4:
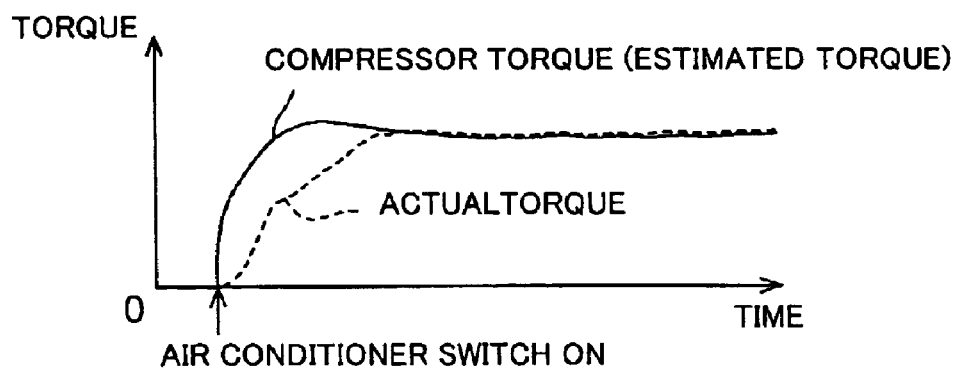
FIG. 4 is a graph showing changes in a compressor torque and an actual torque after an air conditioner switch is turned on in a prior art.

In the above-mentioned preferred embodiment, the air conditioner ECU 81 corrects the calculated torque Tr(n) by both the procedure of the first-order lag and the procedure of the delay. However, the air conditioner ECU 81 may be formed so as to correct the calculated torque Tr(n) only by the procedure of the first-order lag and so as to estimate a corrected torque to be the compressor torque Tr'. In this formation, for example, as shown by the two-dot line in FIG. 3, the difference between the estimated compressor torque Tr' and the actual torque can be smaller than that in a prior art as shown by a solid line in FIG. 4.

In the above-mentioned preferred embodiment, the air conditioner ECU 81 continuously corrects the calculated torque Tr(n). However, the air conditioner ECU 81 may corrects the calculated torque Tr(n) only during the time of transition when the variable displacement of the compressor is rapidly excessively changed. During the other time, that is, During the steady state, the air conditioner ECU 81 may not correct the calculated torque Tr(n) and may estimate the calculated torque Tr(n) to be the compressor torque Tr'. Namely, for example, when a varying rate of the duty ratio Dt is equal to, or more than a predetermined rate, the air conditioner ECU 81 corrects the calculated torque Tr(n). When the varying rate of the duty ratio Dt is less than the predetermined rate, the air conditioner ECU 81 does not correct the calculated torque Tr(n). In this manner, accuracy of the estimation of the compressor torque Tr' during the steady state can be improved.

The engine ECU 82 may estimate the compressor torque Tr'. In this case, the engine ECU 82 may receive operational information (the discharge pressure Pd, the suction pressure Ps and the duty ratio Dt sent as the instruction from the air conditioner ECU 81 to the drive circuit 71) from the air conditioner ECU 81, or may detects the operational information on its own. Also, the air conditioner ECU 81 may be removed, and the engine ECU 82 may serve as the air conditioner ECU 81 for air conditioning control and compressor torque estimation.

The engine ECU 82 may control an ISCV (an idle speed control valve) based on the compressor torque Tr' from the air conditioner ECU 81. This manner stabilizes idling of the engine E.

The engine ECU 82 may control a fuel injection system based on the compressor torque Tr' from the air conditioner ECU 81. In this case, the engine ECU 82 adjusts an injection quantity of the engine E by considering the compressor torque Tr' estimated by the air conditioner ECU 81.

The control valve CV may be changed to a variable set suction pressure type, or a variable set discharge pressure type. The control valve CV internally mechanically detects the suction pressure or the discharge pressure. The control valve CV internally autonomously moves a valve body in such a manner that the displacement of the compressor is changed. The displacement of the compressor is changed so as to cancel change of a detected pressure. A set suction pressure or a set discharge pressure as a standard for positioning the valve body can be adjustable by a compressor control signal from an external device.

The control valve CV may be changed to a bleed control valve that controls an opening degree of the bleed passage 27, not the opening degree of the supply passage 28, so as to adjust the pressure in the crank chamber 12.

The present invention may be applied to a wobble plate type variable displacement compressor.

The present examples and embodiments are to be considered as illustrative and not restrictive, and the invention is not to be limited to the details given herein but may be modified within the scope of the appended claims.

What is claimed is:

1. A compressor torque estimate device in use for a variable displacement compressor whose displacement is variable based on a compressor control signal for estimating a compressor torque of the compressor, the compressor torque estimate device comprising:

a torque calculator calculating a torque required for driving the compressor based on the compressor control signal, thereby obtaining a calculated torque; and a corrector correcting the calculated torque by a procedure of first-order lag, thereby obtaining a corrected torque, the corrector estimating the corrected torque to be the compressor torque.

2. The compressor torque estimate device according to claim 1, wherein the corrector corrects the calculated torque by a procedure of delay in addition to the procedure of the first-order lag.

3. The compressor torque estimate device according to claim 1, wherein a refrigerant circulation circuit in an air conditioner includes the compressor, the air conditioner including:

a pressure differential detector detecting a pressure differential between two pressure monitoring points set in the refrigerant circulation circuit, the pressure differential reflecting the displacement of the compressor; and a compressor controller determining a set pressure differential as a control target based on the compressor control signal, the compressor controller adjusting the displacement of the compressor in such a manner that the pressure differential detected by the pressure differential detector approaches the set pressure differential.

4. The compressor torque estimate device according to claim 3, wherein the torque calculator calculates a torque based on the compressor control signal, pressure in a discharge pressure region in the refrigerant circulation circuit and a rotational speed of the compressor.

5. The compressor torque estimate device according to claim 1, wherein the corrector corrects the calculated torque only during a time of transition when the displacement of the compressor is rapidly excessively changed.

6. An engine control device for controlling an output torque of an engine that drives a vehicle and a variable displacement compressor in an air conditioner for the vehicle, a displacement of the compressor being variable based on a compressor control signal, the engine control device comprising:

a compressor torque estimate device for estimating a compressor torque of the compressor, including:
a torque calculator calculating a required torque for driving the compressor based on the compressor control signal, thereby obtaining a calculated torque; and
a corrector correcting the calculated torque by a procedure of first-order lag, thereby obtaining a corrected torque, the corrector estimating the corrected torque to be the compressor torque; and
an engine controller controlling the output torque of the engine by considering the compressor torque of the compressor estimated by the corrector.

7. The engine control device according to claim 6, wherein the corrector also corrects the calculated torque by a procedure of delay.

8. A method of estimating a compressor torque of a displacement variable compressor whose displacement is variable based on a compressor control signal, the method comprising the steps of:

calculating a torque required for driving the compressor based on the compressor control signal to obtain a calculated torque;

correcting the calculated torque by a procedure of first-order lag to obtain a corrected torque; and estimating the corrected torque to be the compressor torque.

9. The method according to claim 8, wherein the correcting step further includes correcting the calculated torque by a procedure of delay.

10. The method according to claim 8, wherein the correcting step is carried out only during a time of transition when the displacement of the compressor is rapidly excessively changed.

* * * * *